United States Patent
Reddy et al.

(10) Patent No.: US 10,132,120 B2
(45) Date of Patent: Nov. 20, 2018

(54) ELASTOMER-THERMALLY CONDUCTIVE CARBON FIBER COMPOSITIONS FOR ROLLER-CONE DRILL BIT SEALS

(71) Applicant: Halliburton Energy Services, Inc., Houston, TX (US)

(72) Inventors: B. Raghava Reddy, Pearland, TX (US); Feng Liang, Cypress, TX (US); Ping C. Sui, The Woodlands, TX (US); David P. Duckworth, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 265 days.

(21) Appl. No.: 14/912,826

(22) PCT Filed: Sep. 19, 2014

(86) PCT No.: PCT/US2014/056542
§ 371 (c)(1),
(2) Date: Feb. 18, 2016

(87) PCT Pub. No.: WO2015/042388
PCT Pub. Date: Mar. 26, 2015

(65) Prior Publication Data
US 2016/0201397 A1   Jul. 14, 2016

Related U.S. Application Data

(60) Provisional application No. 61/880,587, filed on Sep. 20, 2013.

(51) Int. Cl.
*E21B 10/25* (2006.01)
*F16J 15/10* (2006.01)
(Continued)

(52) U.S. Cl.
CPC ............ *E21B 10/25* (2013.01); *F16J 15/102* (2013.01); *F16J 15/3284* (2013.01); *E21B 2010/225* (2013.01)

(58) Field of Classification Search
CPC .......... F16J 15/162; E21B 10/25; E21B 10/22
See application file for complete search history.

(56) References Cited

U.S. PATENT DOCUMENTS 3,879,044 A * 4/1975 Estes ...................... F16J 15/022
277/651
5,485,890 A  1/1996 Cawthorne et al.
(Continued)

FOREIGN PATENT DOCUMENTS

| CN | 1196451 | 10/1998 |
|----|---------|---------|
| CN | 1738857 | 2/2006 |
| CN | 101052674 | 10/2007 |

OTHER PUBLICATIONS

Zhidong Han, Thermal conductivity of carbon nanotubes and their polymer nanocomposites: A review, Jul. 2011, Progress in Polymer science, vol. 36, issue 7, pp. 914-944 (Year: 2011).*

(Continued)

*Primary Examiner* — Kipp C Wallace
(74) *Attorney, Agent, or Firm* — Baker Botts L.L.P.

(57) ABSTRACT

The present disclosure relates to elastomer-thermally conductive carbon fiber compositions for use in seals for roller-cone drill bits. The present disclosure further relates to seals formed from such compositions and to roller-cone drill bits containing such seals.

14 Claims, 5 Drawing Sheets

(51) Int. Cl.
*F16J 15/3284* (2016.01)
*E21B 10/22* (2006.01)

(56) References Cited

U.S. PATENT DOCUMENTS

| | | | |
|---|---|---|---|
| 5,607,024 | A | 3/1997 | Keith et al. |
| 5,644,956 | A | 7/1997 | Blackman et al. |
| 5,652,290 | A | 7/1997 | Nakamura et al. |
| 6,247,545 | B1 | 6/2001 | Burr et al. |
| 6,406,030 | B1 | 6/2002 | Fang et al. |
| 7,013,998 | B2 * | 3/2006 | Ray .................. E21B 10/25 175/371 |
| 7,094,825 | B2 | 8/2006 | Yamanaka |
| 7,693,695 | B2 | 4/2010 | Huang et al. |
| 7,703,557 | B2 | 4/2010 | Durairajan et al. |
| 7,703,558 | B2 | 4/2010 | Sinor et al. |
| 7,914,006 | B2 | 3/2011 | Smith et al. |
| 8,408,303 | B2 | 4/2013 | Reddy et al. |
| 9,169,377 | B2 | 10/2015 | Nanayakkara |
| 2007/0299200 | A1 | 12/2007 | Kobayashi et al. |
| 2009/0038858 | A1 * | 2/2009 | Griffo .................. E21B 10/25 175/371 |
| 2009/0260888 | A1 * | 10/2009 | Dick .................. E21B 10/24 175/228 |
| 2010/0018778 | A1 * | 1/2010 | Nanayakkara .......... C08L 21/00 175/371 |
| 2011/0017514 | A1 | 1/2011 | Anderele |
| 2012/0141308 | A1 | 6/2012 | Saini et al. |

OTHER PUBLICATIONS

Dahai Zhu, Thermal Conductivity of Composite Materials Containing Copper Nanowires, May 2016, Journal of Nanomaterials, vol. 2016 (Year: 2016).*
International Search Report and Written Opinion, Application No. PCT/US2014/056542, 10 pages, Jan. 15, 2015.
Office Action for Chinese Patent Application No. 2014800455823, dated Dec. 28, 2016; 16 pages.
Office Action for Chinese Patent Application No. 2014800455823, dated Jul. 4, 2017; 15 pages.
International Preliminary Report on Patentability for PCT Patent Application No. PCT/US2014/056542, dated Mar. 31, 2016; 6 pages.

* cited by examiner

ELASTOMER-THERMALLY CONDUCTIVE CARBON FIBER COMPOSITIONS FOR ROLLER-CONE DRILL BIT SEALS

RELATED APPLICATIONS

This application is a U.S. National Stage Application of International Application No. PCT/US2014/056542 filed Sep. 19, 2014, which designates the United States, and which claims priority to U.S. Provisional Application No. 61/880,587 filed Sep. 20, 2013, both of which are incorporated herein by reference in their entirety.

TECHNICAL FIELD

The present disclosure relates to thermally conductive elastomer-thermally conductive carbon fiber compositions for use in seals for roller-cone drill bits. The present disclosure further relates to seals formed from such compositions and to roller-cone drill bits containing such seals.

BACKGROUND

Roller-cone drill bits commonly employ seals to contain lubricant within the bits or to protect internal structures of the bits. Such seals must resist mechanical property degradation during operation under downhole conditions encountered during bit use. Seal failure can result in damage to the bit or time lost when the bit is extracted from the wellbore. Seals with shorter lifespans also result in lost time when the bit must be frequently extracted from the wellbore. Accordingly, materials able to improve seal life are needed.

SUMMARY

The current disclosure relates to a thermally conductive elastomer-thermally conductive carbon fiber composition for use in a roller-cone drill bit seal. The composition may display superior thermal conductivity as compared to elastomer lacking thermally conductive carbon fibers or containing different carbon materials than are disclosed herein.

The current disclosure further relates to a seal for a roller-cone drill bit containing such an elastomer-thermally conductive carbon fiber composition. Such a seal may exhibit improved wear resistance or life when used in a roller-cone drill bit as compared to seals formed from elastomer lacking thermally conductive carbon fibers carbon fibers or containing different carbon materials than disclosed herein.

The current disclosure additionally relates to a roller-cone drill bit containing a seal formed from an elastomer-thermally conductive carbon fiber compositions. Such a roller-cone drill bit may experience less frequent seal failure than a roller-cone drill bit containing seals formed from elastomer lacking thermally conductive carbon fibers carbon fibers of containing different carbon materials than disclosed herein.

BRIEF DESCRIPTION OF THE DRAWINGS

A more complete and thorough understanding of certain embodiments and advantages thereof may be acquired by referring to the following description taken in conjunction with the accompanying drawings, in which like reference numbers indicate like features, and wherein.

DETAILED DESCRIPTION

The present disclosure relates to elastomer-thermally conductive carbon fiber compositions for use in seals for roller-cone drill bits as well as seals formed from such compositions and bits containing such seals.

In specific embodiments, the elastomer-thermally conductive carbon fiber compositions of the present disclosure may have a thermal conductivity of at least 0.5 Watts per meter Kelvin (W/Mk), at least 0.6 W/mK, or at least 1 W/mK.

Elastomer-thermally conductive carbon fiber compositions according to the present disclosure may contain elastomers otherwise suitable for use in seals for roller-cone drill bits. According to one embodiment, elastomers may include hydrogenated nitrile rubber (HNBR), acrylonitrile butadiene styrene (ABS) rubber, ethylene-propylene-diene monomer (EPDM) rubber, ethylene vinyl acetate (EVA) rubber, partially fluorinated rubber, nitrile rubber (NBR), styrene-butadiene rubbers (SBR), natural polyisoprene (NP), polybutadiene (BR), chloroprene rubber (CR), butyl rubber, ethylene polypylene rubber (EPM), epichlorohydrin (ECO), polyacrylic rubber (ACM), silicone rubber (SI), fuorosilicone rubber (FVMQ), fluoroelastomers (FKM), and combinations thereof. According to a more specific embodiment, certain high-cost elastomers, such as perfluoroelastomers may be avoided.

In a specific embodiment, the elastomer-thermally conductive carbon fiber compositions according to the present disclosure may contain at least 5 parts per hundred parts (phr), at least 25 phr, or at least 50 phr graphitized thermally conductive carbon fibers.

Carbon fibers may include non-metallic thermally conductive carbon fibers. Such fibers may be present in a concentration and physical arrangement suitable to allow them to conduct heat away or dissipate heat away from localized areas in the composition. According to one embodiment, carbon fibers may be derived from pitch or may have a high graphite content, which may improve their thermal conductivity. According to another embodiment, carbon fibers may have a longitudinal thermal conductivity of at least 450 W/mK, at least 600 W/mK, or, in a specific embodiment, at least 800 W/mK.

According to one embodiment, thermally conductive carbon fibers may be on a nano or micron scale in diameter. For example, they may be less than 20 microns in diameter, less than 1 micron in diameter, less than 100 nm in diameter, or less than 50 nm in diameter. Thermally conductive carbon fibers may be larger than nano or micron scale in other dimensions. For example, their length may be on a micrometer or even a millimeter scale. In one embodiment, thermally conductive carbon fibers may be from about 20 microns to about 25 mm in length. For example, they may be 2-3 mm long.

Carbon fibers may be chopped or milled in order to obtain the desired length. Chopped fibers are typically longer than 1 mm and all fibers are of uniform length because they are obtained by cutting single filaments into fiber fragments of desired lengths. Milled fibers because of the mechanical process of milling, are in the micron range and are typically shorter than 1 mm. In some embodiments, thermally conducting fibers are mixtures of at least two different lengths, one set of fibers being longer than 1 mm, and another set shorter than 1 mm. In a specific embodiment, the fibers are bimodal in length. In another specific embodiment the fibers are multimodal in distribution. It will be understood by one of ordinary skill in the art that when discussing dimensions of pluralities of individual fibers, such as carbon fibers, dimensions represent an average, median or otherwise representative property of such fibers and may not apply to every fiber in the plurality.

According to another embodiment, the thermally conductive fibers may have a tensile modulus of from about 0.2E+6 psi to 3 E+6 psi. Such a high tensile modulus may provide beneficial mechanical properties when the carbon fibers are included in a seal formed from elastomer-thermally conductive carbon fiber compositions of the disclosure.

According to one embodiment, the carbon fibers may include a pitch-based, high-thermal-conductivity fiber such as that sold under the name ThermalGraph® DKD (Cytec Engineered Materials, Tempe, Ariz.). These carbon fibers have a longitudinal thermal conductivity of 400-650 W/mK, which is 50% higher than metallic copper (Cu). These carbon fibers also have a tensile modulus of at least 100 Msi. Additional properties of ThermalGraph® DKD carbon fibers are provided in Table 1.

TABLE 1

| Property | Value |
| --- | --- |
| Electrical Resistivity | <3.0 micro-ohm-m |
| Bulk Density | 0.25-0.55 g/cm$^3$ |
| Estimated Thermal Conductivity | 400-650 W/mK |
| Average Filament Length | 200 microns |
| Filament Diameter | 10 microns |
| Filament Length Distribution | <20% less than 100 microns and <20% greater than 300 microns |
| Tensile Strength | 200 ksi |
| Tensile Modulus | 100-120 Msi |
| Fiber Density | 2.15-2.20 g/cm$^3$ |
| Carbon Assay | 99+% |
| Surface Area | 0.4 m$^2$/g |

According to another embodiment, the carbon fibers may include a pitch-based, high graphite content carbon fiber such as that sold under the name GRANOC™ XN-100 (Nippon Graphite, Tokyo, Japan). These fibers have a longitudinal thermal conductivity of 900 W/mK. These fibers are available as chopped or milled fibers that are 2-3 mm long. Chopped XN-100 fibers may be 1-25 mm in length. Milled XN-100 fibers may be 50 μm, 150 μm, or 250 μm in length. GRANOC™ XN-100 may have a density of 2.22 g/cm$^3$. The density of thermally conductive fibers is significantly larger than normal carbon particles such as carbon black or carbon fibers because of high percentage of crystalline graphite content.

In a specific embodiment, the elastomer-thermally conductive carbon fiber compositions may include more than one type of carbon fiber in the same composition. Different types of carbon fibers may have different chemical compositions, dimensions such as lengths or diameters, or differences in physical properties such as longitudinal thermal conductivity or tensile modulus.

According to another embodiment, the elastomer-thermally conductive carbon fiber compositions may further include an additional thermally conductive filler. For example, they may contain an inorganic filler such as magnesium oxide, alumina, zinc oxide, or silica.

Elastomer-thermally conductive carbon fiber compositions may be formed in manner similar to elastomeric materials suitable for use in seals of roller-cone drill bits, with carbon fibers added during the process. The discontinuous nature of the carbon fibers may render them free-flowing, which may facilitate blending with other materials. In embodiments containing thermally conductive fillers, they may be added before curing of the elastomer-thermally conductive carbon fiber composite.

The present disclosure also relates to seals for roller-cone drill bits formed from elastomer-thermally conductive carbon fiber compositions as described herein. Such seals, in specific embodiments, may be used to maintain lubricant within the grease reservoir or to prevent entry of fluid into an area containing bearings. Seals may be exposed to the external environment of the bit during drilling.

According to one embodiment, a seal according to the present disclosure may exhibit a longer life during use in a roller-cone drill bit than a similar seal formed only from elastomer or from elastomer containing different carbon materials than those discussed herein.

According to a particular embodiment, a seal according to the present disclosure may be able to dissipate mechanically generated heat from localized areas within the seal. This may help prevent seal failure and thus improve seal life.

According to another particular embodiment, a seal according to the present disclosure may exhibit a high abrasion resistance.

According to another particular embodiment, a seal according to the present disclosure may exhibit a low coefficient of friction.

According to another embodiment, a seal according to the present disclosure may exhibit a decreased tendency to extrude under load than a composition not containing the thermally conducting carbon fibers.

According to still another embodiment, a seal according to the present disclosure may be resistant to chemical interaction with hydrocarbon fluids and drilling fluids encountered in the wellbore of a well being drilled with a roller-cone drill bit.

Figure 6:
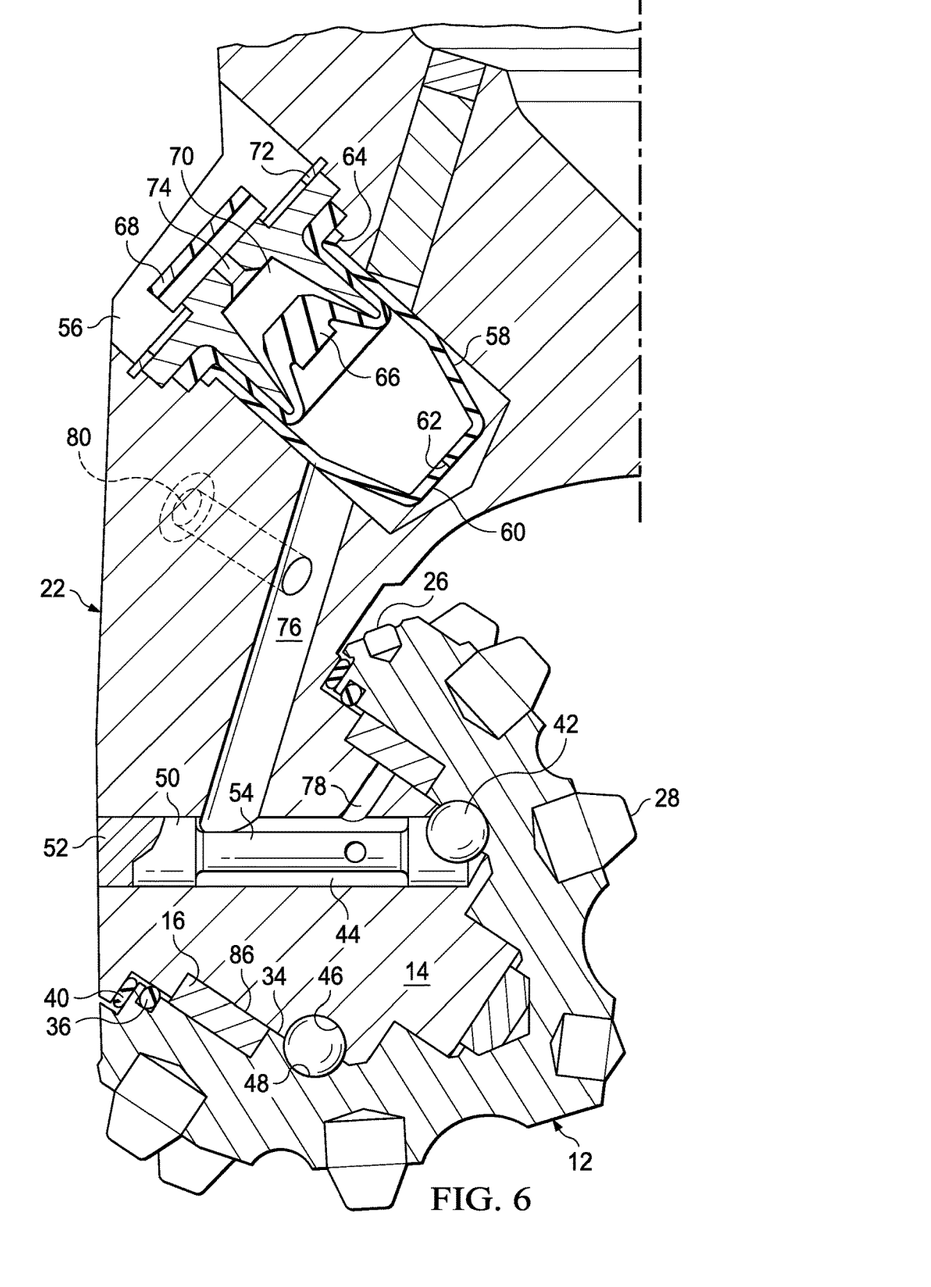
FIG. 6 is a schematic drawing in section with portions broken away showing a support arm, cone assembly and lubrication system associated with the drill bit of FIG. 3.
Figure 7:
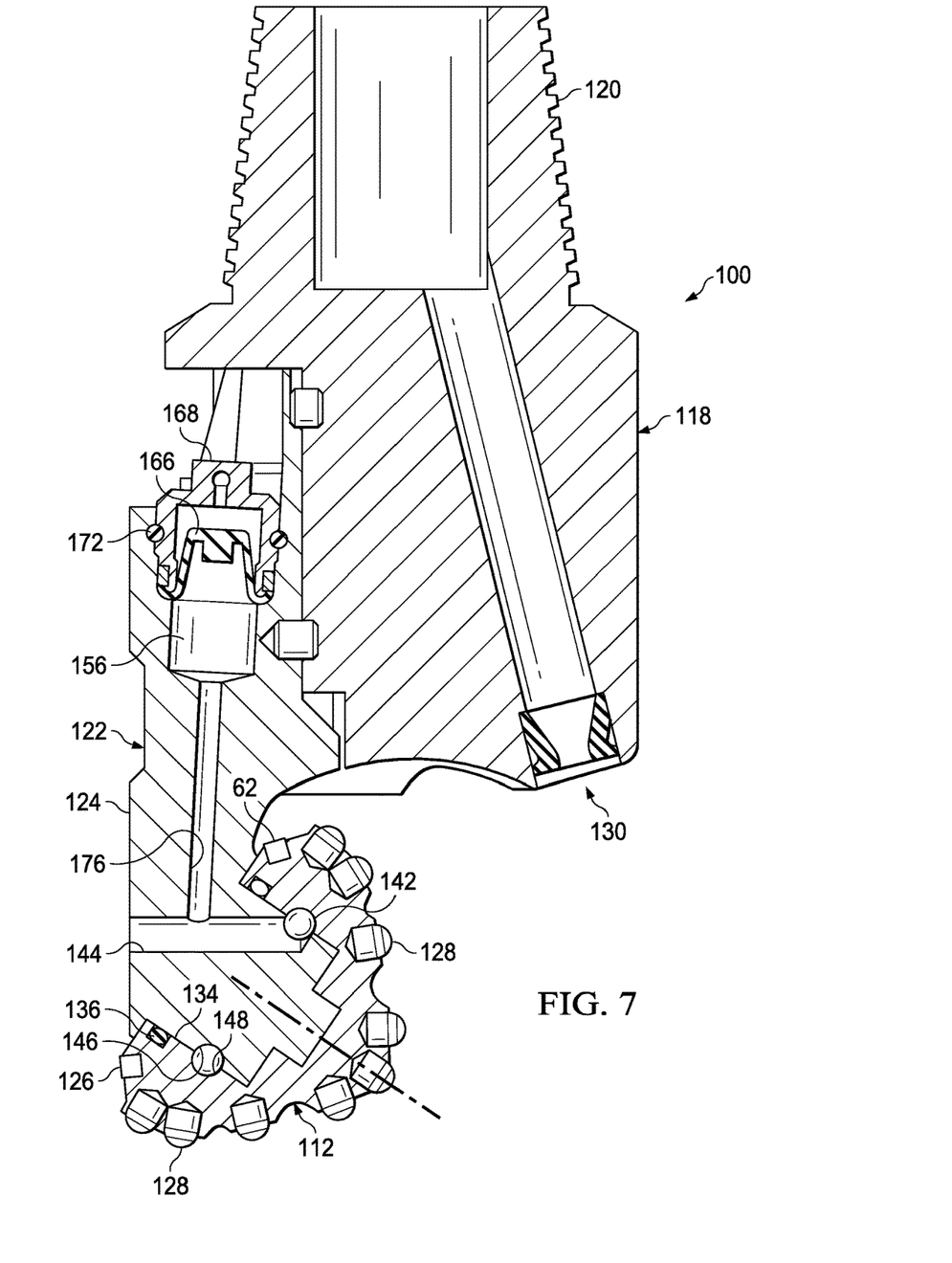
FIG. 7 is a schematic drawing in section with portions broken away showing another example of a rotary cone drill bit having at least one support arm, cone assembly and associated grease system.

According to another embodiment, the present disclosure relates to a roller-cone drill bit containing one or more seals as described herein. Example roller-cone drill bits are shown in FIGS. 5-7.

Figure 5:
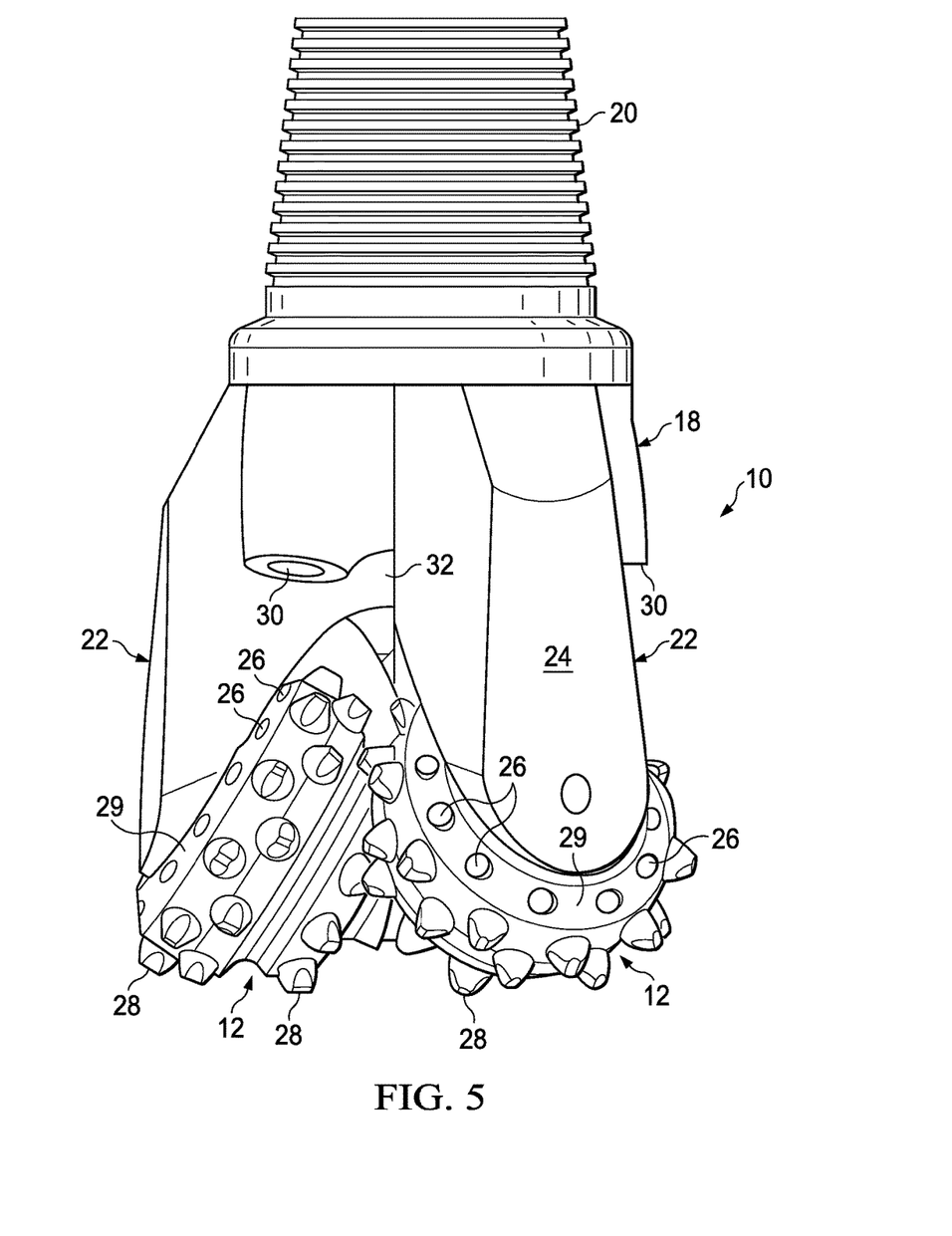
FIG. 5 is a schematic drawing showing an isometric view of one example of a roller cone drill bit.

Drill bit 10 may include a grease cavity 56 which is open to exterior portions of drill bit 10 (not shown in FIG. 5). Grease cavity 56 may include a grease reservoir defined in part by grease container 58 disposed within grease cavity 56. Grease container 58 may include end 60 with opening 62 disposed therein.

The opposite end of grease container 58 may include flanged shoulder 64 supporting flexible resilient diaphragm seal 66 that closes grease container 58. Cap 68 may cover diaphragm seal 66 and define chamber 70 facing diaphragm seal 66. Cap 68, diaphragm seal 66 and grease container 58 may be retained within grease cavity 56 by snap ring 72. Cap 68 may also include opening 74 to allow communication of external fluid pressure surrounding drill bit 10 with exterior portions of diaphragm seal 66. The volume between diaphragm seal 66 and end 60 of grease container 58 may be filled with a grease to lubricate associated bearing 16 and ball bearings 42.

Grease passage 76 may extend through support arm 22 to place grease cavity 56 in fluid communication with ball passage 44. Grease passage 76 may communicate with one end of grease cavity 56 generally adjacent grease opening 62 and grease container 58.

Ball passage 44 may be placed in fluid communication with internal cavity 34 by conduit 78. Upon assembly of drill bit 10, grease passage 76, grease container 58, grease cavity 56, available space in the ball plug passage 44, conduit 78 and available space in internal cavity 34 may be filled with grease through opening 80 in support arm 22. Opening 80 may be subsequently sealed after grease filling.

The pressure of fluids surrounding exterior portions of drill bit 10 may be transmitted to grease disposed in grease container 58 by flexing of diaphragm seal 66. Such flexing of diaphragm seal 66 maintains the grease at a pressure generally equal to the pressure of the external fluids outside drill bit 10. This pressure may be transmitted through grease passage 76, ball passage 44, conduit 78 and internal cavity 34 to the inner face of elastomeric seal 36, which may be a seal as disclosed herein. As a result elastomeric seal 36 may be exposed to an internal pressure from the grease generally equal to the pressure of the external fluids.

FIG. 7 is a schematic drawing showing another example of a rotary cone drill bit which may have one or more lubrication systems filled with grease. Rotary cone drill bit 100 may have three support arms 122 with respective cone assemblies 112 rotatably mounted thereon.

Only one support arm 122 and associated cone assembly 112 is shown in FIG. 7. Drill bit 100 may include one piece or unitary bit body 106. The dimensions of concave exterior surface 110 and the location of cone assemblies 112 may be selected to optimize fluid flow between lower portions 108 of bit body 106.

Cone assemblies 112 of drill bit 100 may be mounted on journal or spindle 114 projecting from respective support arms 102. Each cone assembly 112 may include generally cylindrical cavity 134 sized to receive exterior portions of spindle or journal 114 therein. Each cone assembly 112 and respective spindle 114 may include longitudinal axis 116 which also represents the axis of rotation for each cone assembly 112 relative to its associated spindle 114. Each cone assembly 112 may be retained on its respective journal 114 by a plurality of ball bearings 142. Ball bearings 142 are inserted through opening 120 in exterior surface of support arm 122 and ball retainer passageway 144 of the associated support arm 122. Ball races 146 and 148 may be formed in interior of cavity 134 of the associated cone assembly 112 and the exterior of journal 114.

Ball retainer passageway 144 may communicate connected with ball races 146 and 148 such that ball bearings 142 may be inserted there through to form an annular array within ball races 146, 148 to prevent disengagement of each cone assembly 112 from associated journal 114. Ball retainer passageway 144 is subsequently plugged by inserting a ball plug retainer (not expressly shown) therein. A ball plug weld (not expressly shown) may be formed within each opening 120 to provide a fluid barrier between ball retainer passageway 144 and the exterior of each support arm 122 to prevent contamination and loss of grease from the associated lubrication system.

Each support arm 102 may include grease cavity or grease reservoir 156 having a generally cylindrical configuration. Grease cap 168 may be disposed within one end of grease cavity 156 to prevent undesired fluid communication between grease cavity 134 and the exterior of support arm 102. Grease cap 168 may include flexible, resilient diaphragm seal 166 that closes grease cavity 156. Cap 168 may cover diaphragm seal 166 and define in part chamber 136 which provides a volume into which diaphragm seal 166 may expand. Cap 168 and diaphragm seal 166 may be secured within grease cavity 156 by retainer ring 172.

Grease passage 176 may extend through support arm 122 to allow grease cavity 156 to communicate fluid with ball retainer passageway 144. Ball retainer passageway 144 provides fluid communication with internal cavity 134 of associated cone assembly 112 and bearings disposed between exterior portions of spindle 114 and interior portions of cavity 134. Upon assembly of drill bit 100, grease passage 176, grease cavity 156, any available space between the interior surface of cavity 134 and exterior of spindle 144 may be filled with grease through an opening (not pictured) in each support arm 102.

The pressure of fluids around the exterior of drill bit 100 may be transmitted to grease contained in grease cavity 156 by diaphragm seal 166. Flexing of diaphragm seal 166 maintains the grease at a pressure generally equal to the pressure of fluids around the exterior of drill bit 100. Grease pressure is transmitted through grease passage 176, ball retainer passageway 144 and internal cavity 134 to expose an inward face of seal element 176 to pressure generally equal to the pressure around the exterior of drill bit 100.

Seal element 136, which may be a seal as described herein, may be positioned within a seal retaining groove within cavity 134 to establish a fluid barrier between adjacent portions of cavity 134 and journal 114. Seal element 136, may be an o-ring seal, a t-seal, a v-seal, a flat seal, a lip seal or any other seal operable to establish a fluid barrier between adjacent portions of cavity 134 and journal 114. In addition, more than one seal or a combination of seal and backup ring may be positioned within one or more seal retaining grooves or otherwise between cavity 134 and journal 114. The use of high temperature performance seals according to the present disclosure may allow for less frequent replacement of lubricant in roller-cone drill bits and longer use of such bits.

EXAMPLES

The present disclosure may be better understood through reference to the following examples. These examples are included to describe exemplary embodiments only and should not be interpreted to encompass the entire breadth of the invention.

Example 1—Elastomer-ThermalGraph® DKD Compositions

Figure 1:
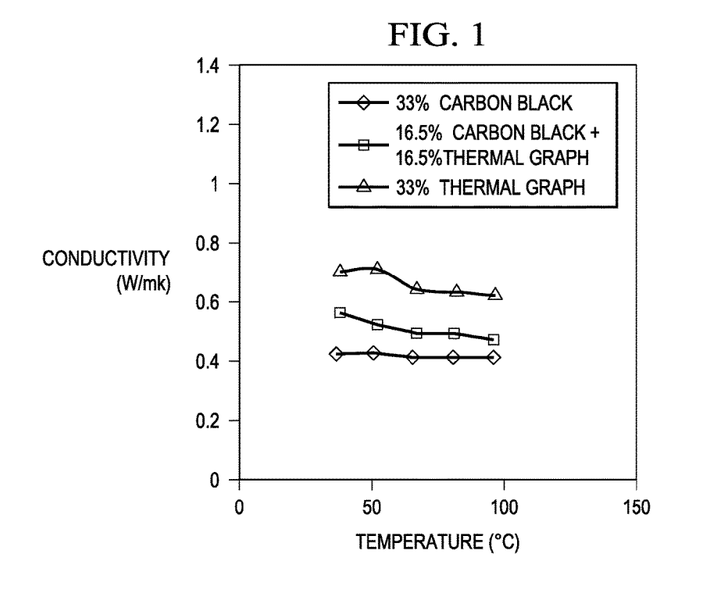
FIG. 1 presents thermal conductivity results for elastomer-thermally conductive carbon fibers compositions.

A blend of namely HNBR 2010 and HNBR 2010 H were mixed by masticating in a rubber mixer with carbon black (33% or 50 phr) as the control sample. The melt blended material was compression molded into a circular disc. The conductivity was measured in W/mK. The thermal conductivity of a typical rubber sample without carbon black is generally about less than 0.3 W/mK. The carbon black containing control sample was about 0.41 W/wK which slightly increased thermal conductivity due to carbon black content. The next samples were prepared with 1:1 combination of highly graphitized ThermalGraph® DKD fibers and carbon black while keeping the total amount carbon filler same as the control sample. Finally, a sample containing exclusively ThermalGraph® DKD fibers was prepared and tested. The thermal conductivity results are shown in FIG. 1. The results in FIG. 1 show that the thermal conductivity of the elastomer can be increased by about 60% by replacing carbon black with thermally conducting graphitized pitch based carbon fibers.

Example 2—Elastomer GRANOC™ or GRANOC™ ThermalGraph® DKD Compositions

Figure 2:
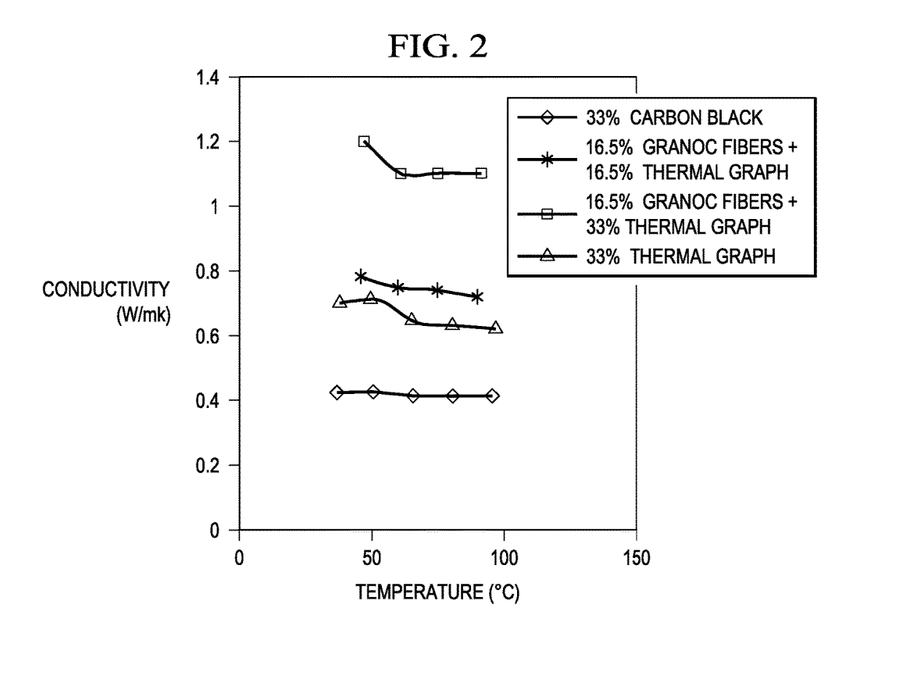
FIG. 2 presents thermal conductivity results for other elastomer-thermally conductive carbon fibers composition.
Figure 3:
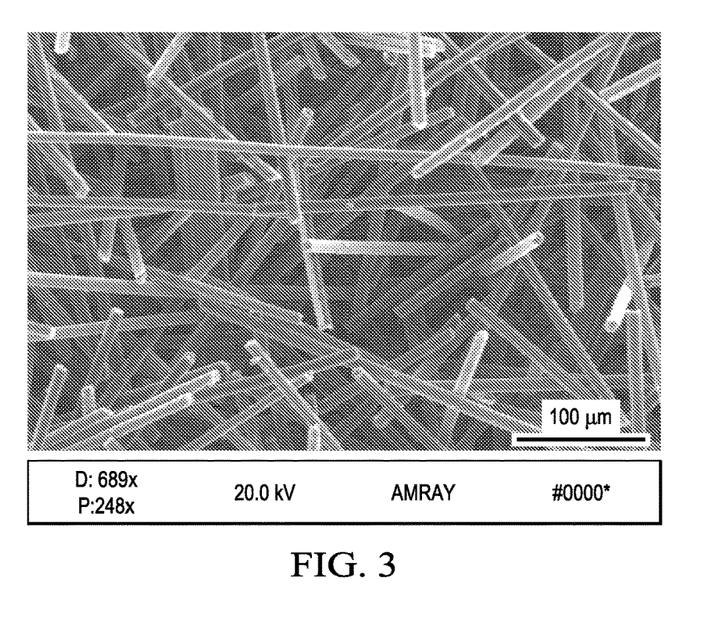
FIG. 3 is SEM image of ThermalGraph DKD.
Figure 4:
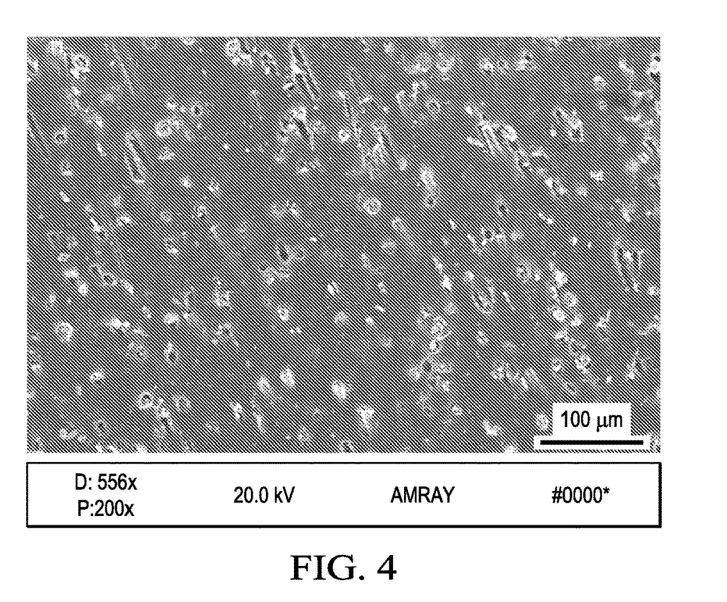
FIG. 4 is SEM image of Sample Set 3 (with Thermal-Graph DKD).

Chopped GRANOC™ XN-100 fibers were tested in combination with ThermalGraph® DKD fibers while keeping the filler content at 50 PHR or higher. The thermal conductivity measurements for these compositions as a function of temperature are reported in FIG. 2. It is found that by using a combination of carbon nanofibers the thermal conductivities of the elastomer can be increased by 100-200% when compared to sample containing only carbon black as the filler.

The mechanical properties were shown in Table 2.

TABLE 2

| Parameter | Commercial Seal | Sample Seal 1 | Sample Seal 2 | Sample Seal 3 |
|---|---|---|---|---|
| Percent Carbon Black Replaced | | 25 | 50 | 75 |
| Shore A Hardness | 84 | 84 | 82 | 80 |
| Tensile Strength (psi) | 3985 | 3741 | 3039 | 2371 |
| % Elongation | 201 | 213 | 231 | 261 |
| Modulus @ 100% (psi) | 2217 | 1802 | 1149 | 810 |
| Compression Set (%) | | | | |
| 22 hrs @ 150° C. | 14 | 14 | 14 | 15 |
| 22 hrs @ 175° C. | 14 | 18 | 17 | 17 |

By replacing the partial amount of the regular carbon black with ThermalGraph DKD, the seal material become softer and has longer elongation.

The seals went through the house-invented rotary seal tests to evaluate their lifetime. The results were listed in Table 3. It indicates that by incorporating ThermalGraph DKD in the seal recipe, the lifetime of the seals have been extended. The temperature measured in this test is the metal temperature instead of the seal temperature. The increased surface temperature indicates that by incorporating of the ThermalGraph DKD material, the heat was efficiently transferred to the metal part. The average lifetime for the standard commercial seal is 82 hours, while the Sample Seal 1 have achieved to 109 hours and Sample Seal 3 has achieved to 150 hours, which is 83% of increase.

TABLE 3

Rotary Seal Test.

| | Commercial Seal | Sample Seal 1 | Sample Seal 3 |
|---|---|---|---|
| Number of Tests | 10 | 3 | 3 |
| Average Hours | 82 | 109 | 150 |
| Average Steady State Contact Temperature (° F.) | 285 | 326 | 300 |
| Average Steady State Torque (in/lbs) | 51 | 78 | 71 |
| Cross Section Reduction (mils) | 36 | 20 | 21 |

Although only exemplary embodiments of the invention are specifically described above, it will be appreciated that modifications and variations of these examples are possible without departing from the spirit and intended scope of the invention.

The invention claimed is:

1. A seal for a roller-cone drill bit comprising an elastomer-thermally conductive carbon fiber composition comprising: an elastomer; and at least 5 parts per hundred parts (phr) pitch-based graphitized thermally conductive carbon fibers, wherein the pitch-based graphitized thermally conductive carbon fibers comprise at least two types of carbon fibers, and wherein the elastomer thermally conductive carbon fiber composition has a thermal conductivity 100-200% higher than an otherwise identical composition containing an amount in phr of carbon black equal to the amount of carbon fibers in phr, but lacking carbon fibers.

2. The seal according to claim 1, wherein the elastomer comprises hydrogenated nitrile rubber (HNBR), acrylonitrile butadiene styrene (ABS) rubber, ethylene-propylene-diene monomer (EPDM) rubber, ethylene vinyl acetate (EVA) rubber, partially fluorinated rubber, nitrile rubber (NBR), styrene-butadiene rubbers (SBR), natural polyisoprene (NP), polybutadiene (BR), chloroprene rubber (CR), butyl rubber, ethylene polypylene rubber (EPM), epichlorohydrin (ECO), polyacrylic rubber (ACM), silicone rubber (SI), fuorosilicone rubber (FVMQ), fluoroelastomers (FKM), or any combinations thereof.

3. The seal according to claim 1, wherein the pitch-based thermally conductive carbon fibers have a longitudinal thermal conductivity of 400-650 W/mK.

4. The seal according to claim 1, wherein the pitch-based thermally conductive carbon fibers have a longitudinal thermal conductivity of 900 W/mK.

5. The seal according to claim 1, wherein the pitch-based thermally conductive carbon fibers have a density of 2.22 g/cm$^3$.

6. The seal according to claim 1, wherein the thermally conductive carbon fibers comprise at least two types of carbon fibers, a first a pitch-based thermally conductive carbon fiber having a longitudinal thermal conductivity of 400-650 W/mK and a second pitch-based thermally conductive carbon fiber having a longitudinal thermal conductivity of 900 W/mK.

7. The seal according to claim 1, wherein the thermally conductive carbon fibers comprise at least two types of carbon fibers, a first a pitch-based thermally conductive carbon fiber having a longitudinal thermal conductivity of 400-650 W/mK and a second pitch-based thermally conductive carbon fiber having a density of 2.22 g/cm$^3$.

8. A roller-cone drill bit comprising: a bit body having at least one support arm extending therefrom;
a respective cone assembly rotatably mounted on a spindle extending from each support arm;
a seal disposed in at least one support arm, wherein the seal comprises an elastomer-thermally conductive carbon fiber composition comprising: an elastomer; and
at least 5 parts per hundred parts (phr) pitch-based graphitized thermally conductive carbon fibers, wherein the pitch-based graphitized thermally conductive carbon fibers comprise at least two types of carbon fibers, and wherein the elastomer thermally conductive carbon fiber composition has a thermal conductivity 100-200% higher than an otherwise identical composition containing an amount in phr of carbon black equal to the amount of carbon fibers in phr, but lacking carbon fibers.

9. The bit according to claim 8, wherein the elastomer comprises hydrogenated nitrile rubber (HNBR), acrylonitrile butadiene styrene (ABS) rubber, ethylene-propylene-diene monomer (EPDM) rubber, ethylene vinyl acetate (EVA) rubber, partially fluorinated rubber, nitrile rubber (NBR), styrene-butadiene rubbers (SBR), natural polyisoprene (NP), polybutadiene (BR), chloroprene rubber (CR), butyl rubber, ethylene polypylene rubber (EPM), epichlorohydrin (ECO), polyacrylic rubber (ACM), silicone rubber (SI), fuorosilicone rubber (FVMQ), fluoroelastomers (FKM), or any combinations thereof.

10. The bit according to claim 8, wherein the pitch-based thermally conductive carbon fibers have a longitudinal thermal conductivity of 400-650 W/mK.

11. The bit according to claim 8, wherein the pitch-based thermally conductive carbon fibers have a longitudinal thermal conductivity of 900 W/mK.

12. The bit according to claim 8, wherein the pitch-based thermally conductive carbon fibers have a density of 2.22 g/cm$^3$.

13. The bit according to claim 8, wherein the thermally conductive carbon fibers comprise at least two types of carbon fibers, a first a pitch-based thermally conductive carbon fiber having a longitudinal thermal conductivity of 400-650 W/mK and a second pitch-based thermally conductive carbon fiber having a longitudinal thermal conductivity of 900 W/mK.

14. The bit according to claim 8, wherein the thermally conductive carbon fibers comprise at least two types of carbon fibers, a first a pitch-based thermally conductive carbon fiber having a longitudinal thermal conductivity of 400-650 W/mK and a second pitch-based thermally conductive carbon fiber having a density of 2.22 g/cm$^3$.

* * * * *